(12) United States Patent
Liu (10) Patent No.: US 7,765,598 B2
(45) Date of Patent: Jul. 27, 2010

(54) METHOD OF ONLINE DETECTING MP3 MUSIC TRANSMISSIONS AND AN ARCHITECTURE THEREOF

(75) Inventor: Chih-Chin Liu, Hsinchu (TW)

(73) Assignee: Chung Hua University, Hsin Chu (TW)

( * ) Notice: Subject to any disclaimer, the term of this patent is extended or adjusted under 35 U.S.C. 154(b) by 1275 days.

(21) Appl. No.: 11/288,187

(22) Filed: Nov. 29, 2005

(65) Prior Publication Data

US 2007/0124822 A1     May 31, 2007

(51) Int. Cl.
    *G06F 7/04*      (2006.01)
(52) U.S. Cl. ............................................. 726/26; 726/13
(58) Field of Classification Search .................. 726/26, 726/13
See application file for complete search history.

(56) References Cited

U.S. PATENT DOCUMENTS

| 7,565,327 | B2 * | 7/2009 | Schmelzer | .................... 705/67 |
| 2004/0128198 | A1 * | 7/2004 | Register et al. | ................ 705/14 |
| 2005/0180341 | A1 * | 8/2005 | Nelson et al. | ................ 370/260 |

\* cited by examiner

*Primary Examiner*—Christopher J Brown
(74) *Attorney, Agent, or Firm*—Rosenberg, Klein & Lee (57) ABSTRACT

The present invention discloses a method of online detecting MP3 music transmissions and an architecture thereof, wherein the packets transmitted over network segments are intercepted by an MP3 packet sniffing technology; the feature values of the MP3 packets are extracted out via an MP3 music feature value extraction technology and then compared with an MP3 feature value database, and thereby, the IP addresses of the sender and the receiver, which perform an illegal MP3 transmission, are detected and recorded in order to implement investigation and protect intellectual property.

11 Claims, 7 Drawing Sheets

METHOD OF ONLINE DETECTING MP3 MUSIC TRANSMISSIONS AND AN ARCHITECTURE THEREOF

BACKGROUND OF THE INVENTION

1. Field of the Invention

The present invention relates to a method of online detecting MP3 music transmissions and an architecture thereof, particularly to a method of online detecting MP3 music transmissions and an architecture thereof, which utilizes an MP3 packet capture technology and an MP3 content-based retrieval technology to detect illegal MP3 transmissions.

2. Description of the Related Art

Owing to the explosive advance of the hardware and the extensive prevalence of the Internet, the digital music has been popularized globally. MP3 (MPEG 1 Audio, Layer 3) is a compression format of high-quality and high-compression ratio and dominates in audio-file storage and transmission. However, it is exactly the high quality and high compression ratio that makes illegal MP3 music files flood all over the Internet, which infringes upon the intellectual property seriously and brings about the loss obviously, and the authorities have also suffered from the illegal behavior for long because of lacking an effective inhibition mechanism.

Just like that the fingerprint can identify a person, the MP3 fingerprint can identify an MP3 file. Cano, et al. pointed out: The audio fingerprint is usually constructed with a digital signature or a multi-dimensional feature value, and some methods, such as the Euclidean method, are used to calculate the similarity thereof; in order to increase the comparing efficiency, some data-structure technologies are used to filter out less-possible samples and reduce the work-load of comparing calculation. However, extra-added data, such a digital signature, may be doctored; besides, most MP3 files are not appendixed with a digital signature. Therefore, the digital signature does not benefit the identification of MP3 files very much. Contrarily, the feature-value fingerprint is derived from the file itself. Even though the outward data is incorrect or modified, the real identity can still be acquired from the file itself. At present, the related researches can be roughly grouped into the fingerprint-construction part and the fingerprint-identification part.

The current MP3-identification technology and related literatures is stated blow.

Haitsma, Kalker, Oostveen et al. derive a 32-bit sub-fingerprint from per 11.6 msec of data, and 256 derived sub-fingerprints are integrated into about three seconds of fingerprint of a song. When the comparison is performed, each of the 256 sub-fingerprints is compared individually, and the similarity is determined by the integrated result of the 256 comparing calculations. As the comparing result depends on the 256 separate comparing calculations, the fault tolerance of the comparing calculations increases.

Lu used two kinds of fingerprints—the authentication fingerprint and the identification fingerprint—to perform identification. Firstly, the authentication fingerprint is used to find out possible samples, and then, the identification fingerprint is used to perform detailed comparing operation; thereby, the calculation cost is effectively saved.

Burges, Platt, Jana, et al. proposed a Distortion Discriminant Analysis method to extract out the feature values, wherein the Oriented Principal Components Analysis process is repeated twice to concentrate the 2048-dimensional audio information into a 64-dimensional coefficient in order to relieve the high-dimension problem. Besides, the imperceptible portion of the audio information is also removed to reduce the data quantity.

Sukittanon and Atlas proposed a feature value combining audition and frequency-modulation, wherein 15 seconds of audio data is firstly processed by Fourier transformation and then decomposed by frequency-modulation and lastly sub-band-normalized in order to reduce time and frequency distortions.

Herre, Hellmuth, Cremer, et al. pointed out that just MPEG-7 itself defines two structures—the low level descriptor and the description scheme, which may be regarded as fingerprints and can be used to describe audio information; the low level descriptor can be used to extract out a feature value, and the description scheme can be used to classify feature values, and thereby, the contents of audio information can be correctly described.

Seifer proposed an LSM (Leadsheet model), wherein four steps—pitch estimation, pitch aggregation, hypothesis creation, and hypothesis confirmation—are used to describe the melody, rhythm, accompaniment, etc. of a song.

Miller, Rodriguez, Cox et al. embedded a given fingerprint into a 256-dimensional hierarchical structure. Via the correlation format constructed with the hierarchical structure, the depth of the hierarchical structure and the bit error rate, the closest answer can be obtained.

It is ineffective and laborious to on-side search a suspected illegal transmission; therefore, the present invention proposes a method of online detecting MP3 music transmissions and an architecture thereof, which effectively detects and records the IP addresses of the sender and the receiver of an illegal MP3 music transmission in order to implement investigation and secure musical intellectual property.

SUMMARY OF THE INVENTION

The primary objective of the present invention is provide to a method of online detecting illegal MP3 music transmissions and an architecture thereof, which utilizes an MP3 packet capture technology, an MP3 music feature value extraction technology, and an MP3 feature value database to detect and record the IP addresses of the sender and the receiver, which perform an illegal MP3 transmission, in order to implement investigation and protect music intellectual property.

Another objective of the present invention is provide to a method of online detecting illegal MP3 music transmissions and an architecture thereof, which can effectively detect illegal MP3 transmissions and protect the music intellectual property from illegal usage and illegal broadcast without the allowance of the owner.

To achieve the abovementioned objectives, the present invention proposes a method of online detecting illegal MP3 music transmissions, which comprises the following steps: intercepting packets transmitted over network segments; sniffing out MP3 packets according to the header format formulated by MPEG organization; extracting out at least one feature value from each MP3 packet; comparing the feature value of each MP3 packet with the MP3 feature values stored in an MP3 database to obtain the similarity therebetween; and feeding back the similarity information and the related data.

The present invention also proposes a system of online detecting illegal MP3 music transmissions, which comprises: an MP3 sniffer, intercepting packets transmitted over network segments, and sniffing out MP3 packets according to the header format formulated by MPEG organization; an MP3 authentication server, receiving the MP3 packets, and extracting out a feature value from each of the MP3 packets; an MP3 database, storing the feature values of copyrighted MP3 music; and an MP3 discriminator, receiving and comparing the feature values coming from the MP3 authentication server and the feature values of the copyrighted MP3 music coming from the MP3 database to obtain the similarity therebetween, and feeding back the similarity and the related data to the authentication server.

DETAILED DESCRIPTION OF THE INVENTION

Figure 1:
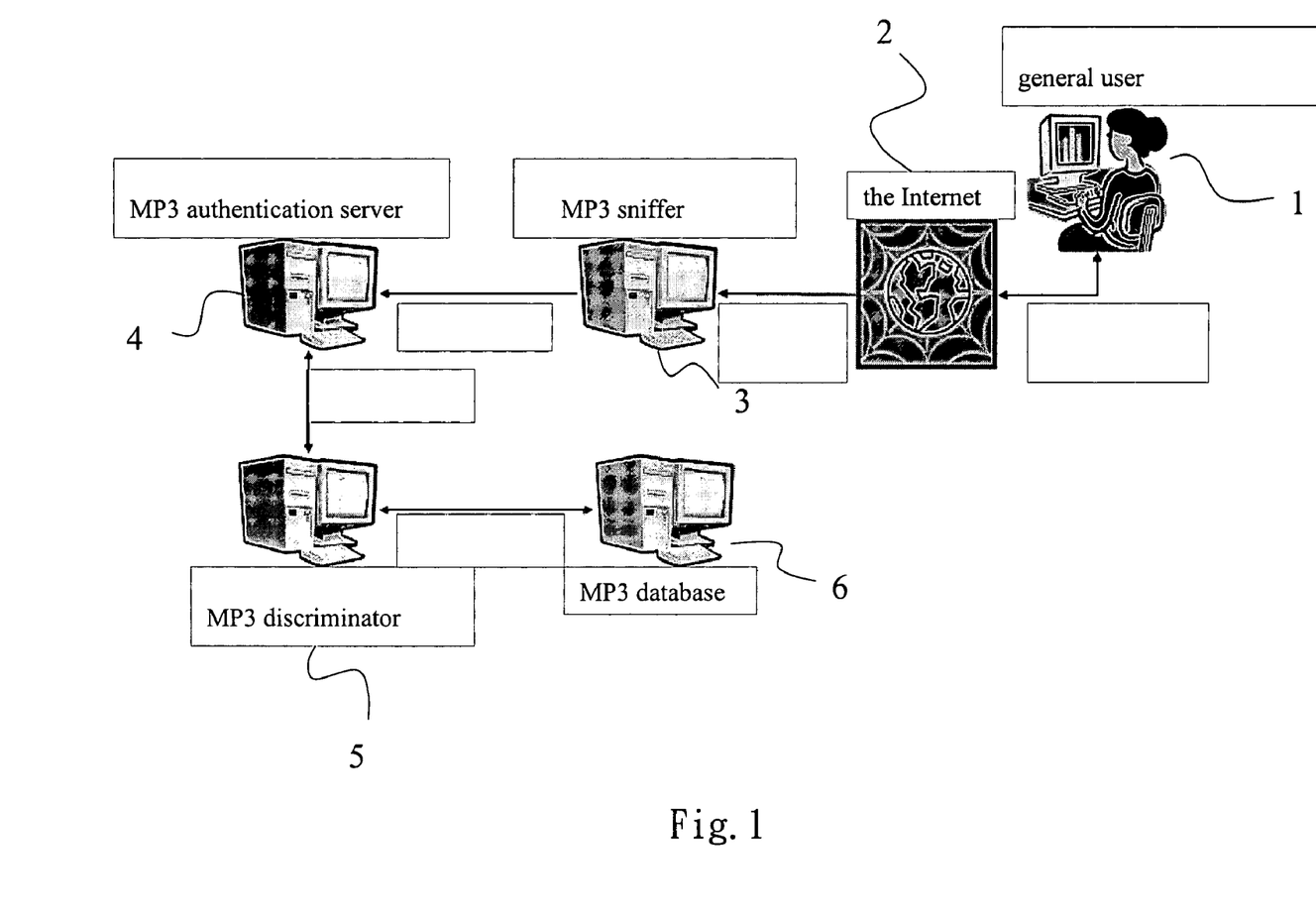
FIG. 1 is a diagram schematically showing the architecture of the present invention.

Refer to FIG. 1 a diagram schematically showing the architecture of the present invention. The architecture of the present invention primarily comprises: a general user 1, intending to perform an illegal MP3 music transmission; an MP3 sniffer 3, linked to the Internet 2; an MP3 authentication server 4, linked to the MP3 sniffer 3; an MP3 discriminator 5, linked to the MP3 authentication server 4; and an MP3 database 6, linked to the MP3 discriminator 5.

Figure 2:
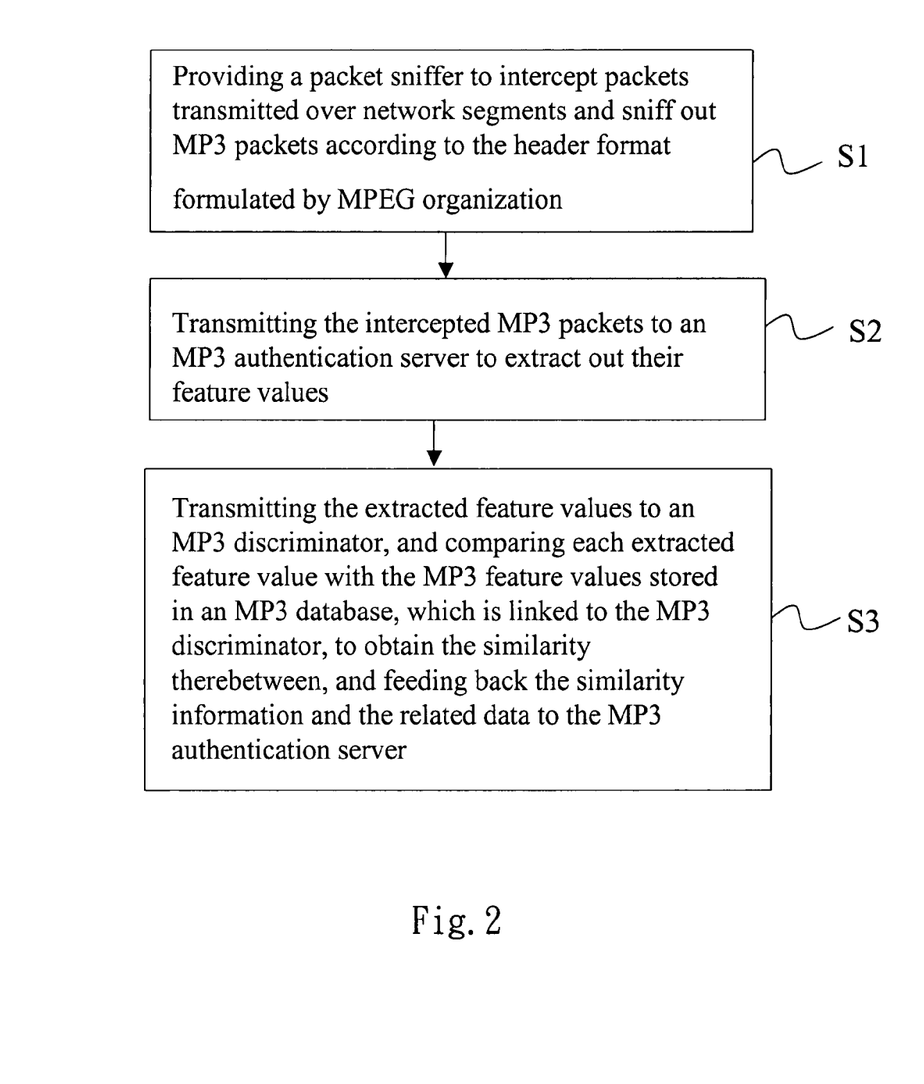
FIG. 2 is a flowchart of the method of the present invention.

Refer to FIG. 2 for the method of online detecting illegal MP3 music transmissions under the architecture of the present invention. The method of the present invention comprises: providing a packet sniffer to intercept packets transmitted over network segments and sniff out MP3 packets according to the header format formulated by MPEG organization (step S1); transmitting the intercepted MP3 packets to an MP3 authentication server to extract out their feature values (step S2); and transmitting the extracted feature values to an MP3 discriminator, and comparing each extracted feature value with the MP3 feature values stored in an MP3 database, which is linked to the MP3 discriminator, to obtain the similarity therebetween, and feeding back the similarity information and the related data to the MP3 authentication server (step S3).

The primary steps of the method of the present invention have been shown in FIG. 2, and the devices of the architecture of the present invention are to be described below in detail:

MP3 sniffer: it is used to intercept MP3 packets transmitted over networks. Firstly, let the network card enter into a promiscuous mode so that all the packets passing through the IP address can be intercepted. Next, the MP3 sniffer step-by-step finds out the portion, which really carries data, according to the header information of the packet, in order to determine whether the packet is an MP3 packet. The MP3 packets will be accumulated to a given quantity and then transmitted to the MP3 authentication server. The format of MP3 header is shown in Table. 1.

TABLE 1

MP3 Packet Format Description

| | |
|---|---|
| 0a0 c13 e7 4a | Destination MAC address |
| 0 10 b5 d3 76 d2 | Source MAC address |
| 8 0 | IP packet |
| cb cc 99 b0 | Source IP |
| c0 a8 11a | Destination IP |
| 0 14 | Source connection port |
| 4 44 | Destination connection port |
| ff fb 90 6c | MP3 packet header |

With respect to the MP3 packet sniffing technology, as FTP and P2P are the most popular transmission protocols for transmitting MP3 music data, the discussion will be based on FTP and P2P herein. According to FTP, both sides of a data transmission have to talk via a connection port 21, and one side will inform the other side which connection port of his own side is intended to be linked for the data transmission. Thus, the MP3 sniffer will keep monitoring the connection port 21, and the intercepted packet will be layer-by-layer dismantled from IP header to TCP header to acquire the real position where data is transmitted, which is then checked to see whether there is connection-port information. If there is, the MP3 sniffer will monitor the exact data-transmission connection port according to the connection-port information. For example, the port 192,168,1,26,13,64 means that the computer 192,168,1,26 will use the connection port 3392 (13×256+64) to undertake a data transmission; then, the MP3 sniffer merely needs to monitor this connection port. The MP3 packet intercepted by the MP3 sniffer is exemplified in FIG. 3, and the description of the fields thereof is shown in Table. 2.

TABLE 2

MP3 Header Format Description

| Bit position | Length | Description |
|---|---|---|
| 0-11 | 12 bits | Synchronization Word |
| 12 | 1 bit | Algorithms flag |
| 13-14 | 2 bits | MPEG Layer flag |
| 15 | 1 bit | Error flag |
| 16-19 | 4 bits | Bitrate flag |
| 20-21 | 2 bits | Sampling rate |
| 22 | 1 bit | Buffering flage |
| 23 | 1 bit | Private bit |
| 24-25 | 2 bits | Channel mode (stereo, mono) |
| 26-27 | 2 bits | Mode extension (only for joint-stereo) |
| 28 | 1 bit | Copyright flag |
| 29 | 1 bit | Original flag |
| 30-31 | 2 bits | Emphasis flag |

Figure 3:
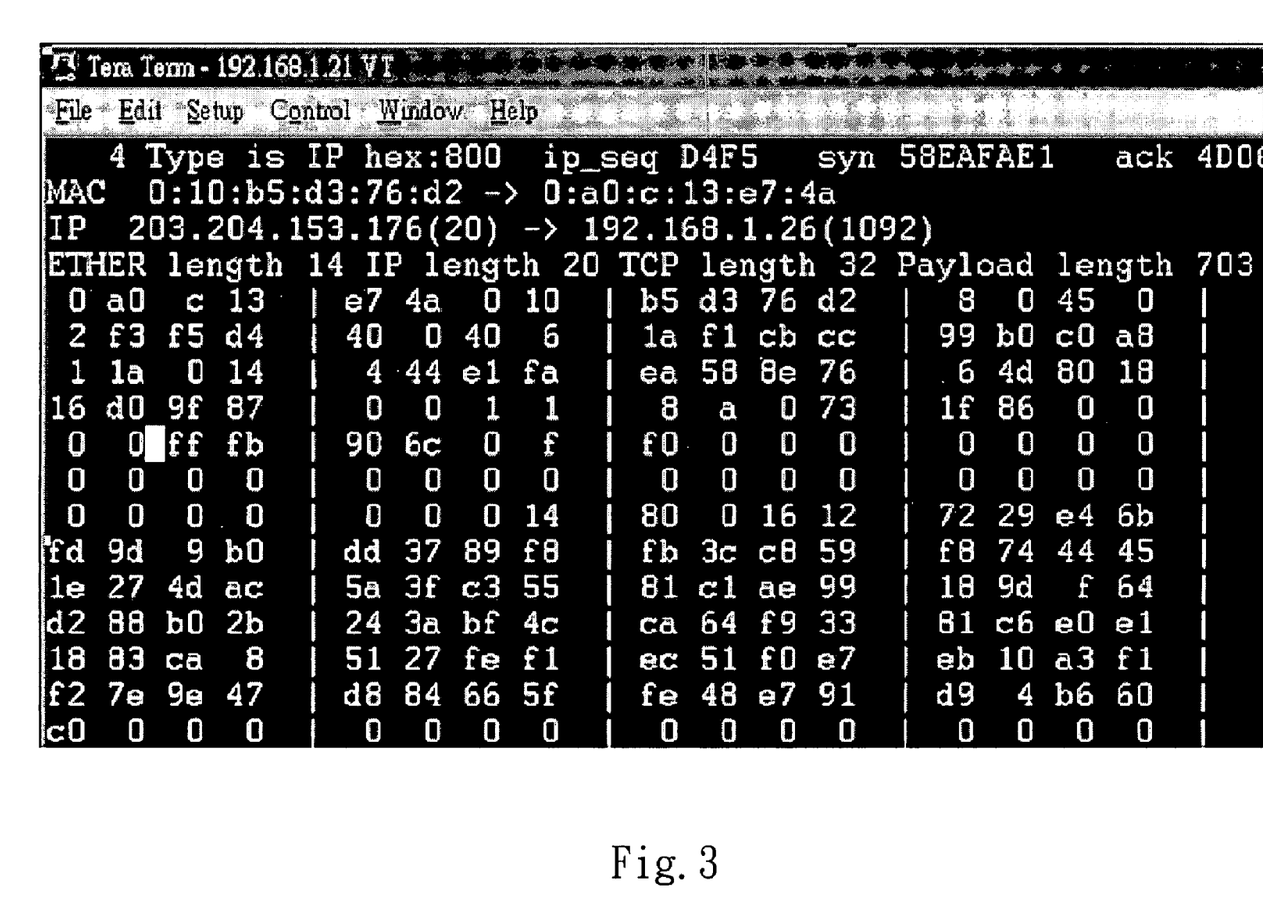
FIG. 3 is a diagram showing an example of an MP3 packet intercepted by the MP3 sniffer according to the present invention.
Figure 4:
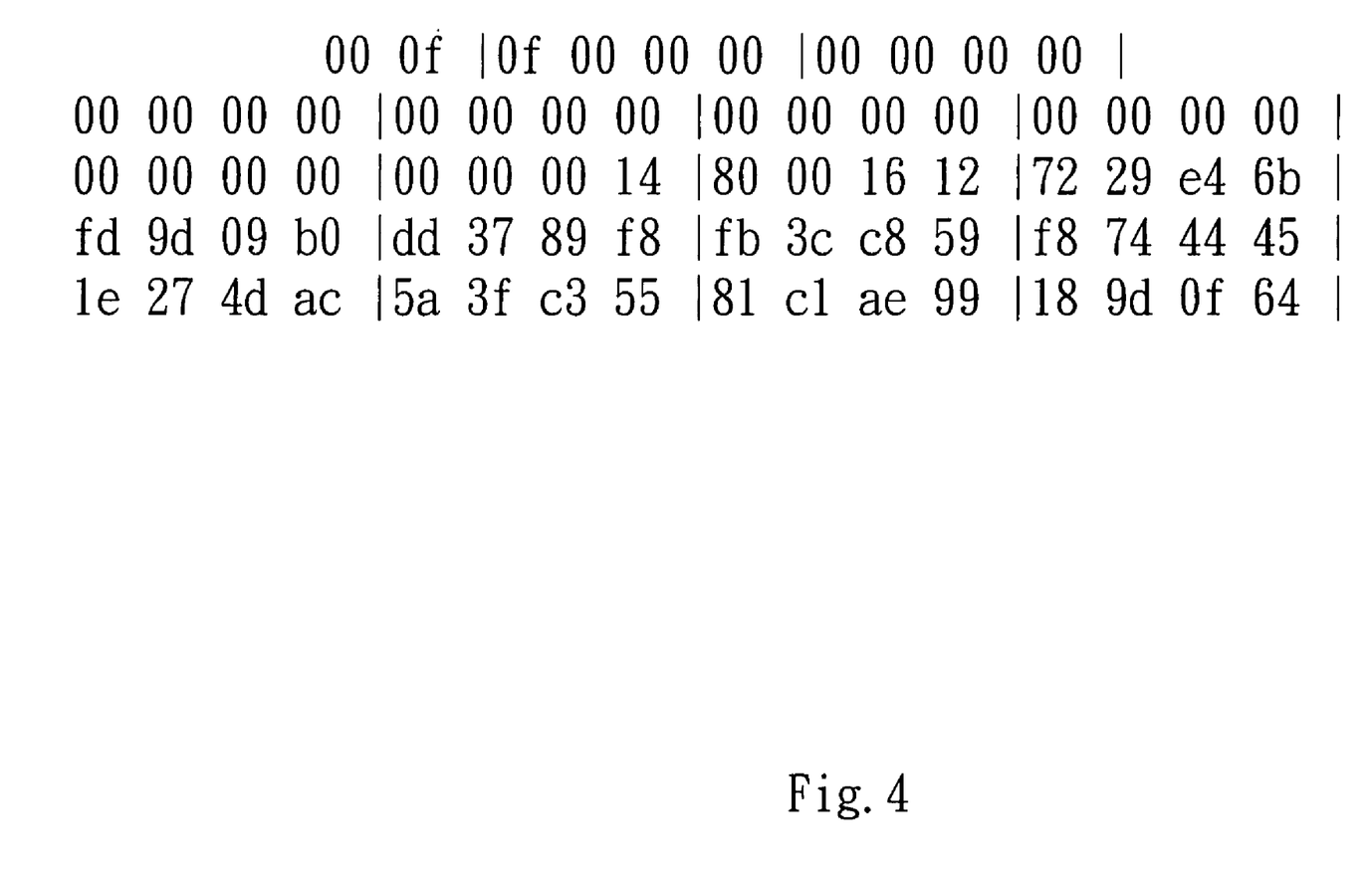
FIG. 4 is a diagram showing an example of the header of an MP3 packet intercepted by the MP3 sniffer according to the present invention.
Figure 5:
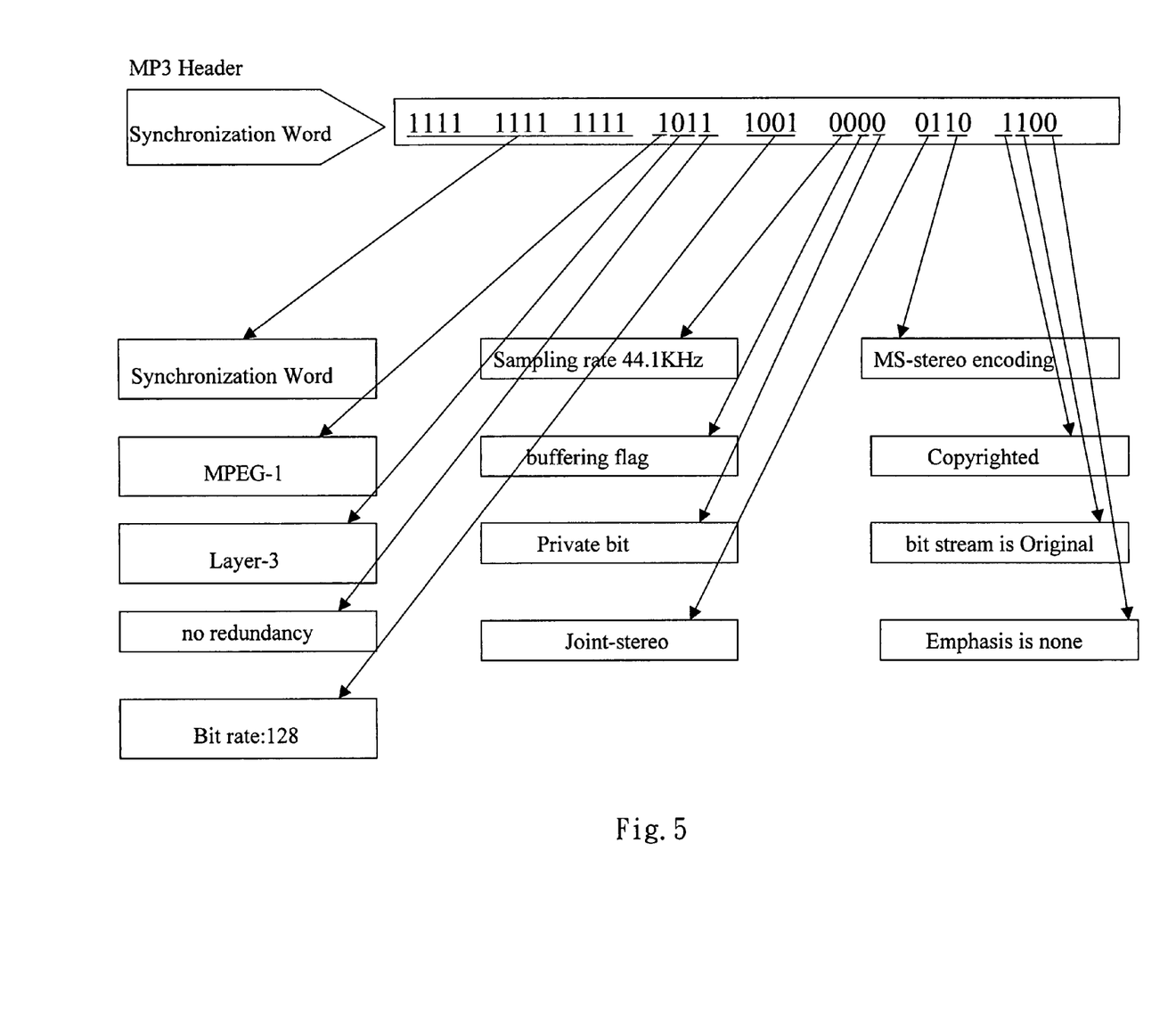
FIG. 5 is a diagram showing the analysis of a head format.

According to the MP3 standard, the meanings of the fields in the MP3 header has been shown in Table. 2. The MP3 music shown in FIG. 3 is to be used as an exemplification. The header of the MP3 packet captured by the MP3 sniffer is shown in FIG. 4. When the MP3 header ff fb 90 6c is expressed in the binary system, it will be 1111 1111 1111 1011 1001 0000 0110 1100. Refer to FIG. 5 also. The anterior twelve bits 1111 1111 1111 (from the zeroth one to the eleventh one) is the Synchronization Words. Among from the twelfth bit to the fifteenth bit 1011, the first one 1 represents MPEG-1; the second and the third ones 01 represents Layer-3; the fourth one 1 represents no redundancy. The bits of from the sixteenth one to the nineteenth one 1001 represents that the Bitrate is 128 kbit/sec. The twentieth bit and the twenty-first bit 00 represents that the sampling rate is 44.1 KHz. The twenty-second bit 0 is the dedicated buffering flag of the sampling rate of 44.1 KHz. The twenty-third bit 0 is a private bit, and it has no definition herein. The twenty-fourth bit and the twenty-fifth bit 01 represents that the current music is joint-stereo. The twenty-sixth bit and the twenty-seventh bit 10 represents that the subbands ranging from the twelfth one to the thirty-first one are MS-stereo encoded. The twenty-eighth bit 1 represents that the current music is copyrighted. The twenty-ninth bit 1 represents that the bit stream of the current MP3 music is original. The thirty-first bit and the thirty-second bits 00 represents that the Emphasis is none. Thus, whether a transmitted file is an MP3 file can be determined according to whether the header of the transmitted file conforms to the MP3 header.

MP3 authentication server: The MP3 authentication server utilizes a Web Service technology to extract out the feature value of a 128 kbit of MP3 file, which comes from the MP3 sniffer on the client side, and transmits the extracted feature values to the rear end to compare the extracted feature value with the MP3 feature values stored in the MP3 database to determine whether the transmission of the MP3 file is illegal; if it is illegal, the transmission date and the IP addresses of the sender and the receiver will be recorded in an illegal-transmission log.

TABLE 3

Functions of MP3 Authentication Server

| Function | Description |
|---|---|
| MP3_ID_Request | Providing online illegal MP3-transmission identification service for the MP3 sniffer, wherein after receiving the MP3 file from the MP3 sniffer on the client side and confirming the identity and password, the MP3 authentication server extracts out the feature value of the MP3 file and sends it to the MP3 feature value database for the succeeding comparison; as what the user needs is usually the information of illegal MP3 transmissions during an interval of time, the comparing results will not be fed back in real time but will be stored in the database until the user utilizes the CheckLog service. |
| SnifferRegist | Providing registering service for general users of the MP3 sniffer, wherein before utilizing the MP3_ID_Request function, the user is requested to enter his basic data, such as the IP, host name, self-determined password and email address, in order to protect the rights and interests of the users of the MP3 sniffer on the client side. |
| CheckLog | Providing illegal MP3-transmission information for registered users, wherein after the account and password has been confirmed, the registered user can utilize the CheckLog function to obtain the status of illegal MP3 transmissions anytime. |
| MemberRegist | Providing registering service for registered music-company member, wherein before utilizing the Web Service, such as the RegistNewSongs function and the MemberCheckState function, the registered music-company member is requested to enter his basic data, including its member name, self-determined password, contacts, contact phone numbers and email address, in order to protect the rights and interests of the members. |
| RegistNewSongs | Providing the function of entering the MP3 feature values of new songs for the registered music-company members, wherein the MP3 feature values of new songs will be used by the MP3 sniffer in performing the MP3_ID_Request function; the member is requested to enter its member name, password, ISRC codes of the songs, and 32 feature values of each song in order to complete the register of new songs; thereafter, the illegal transmissions of the MP3 files of the songs can be detected and recorded so that the rights and interests of the music-company members will be protected. |
| MemberCheckState | Providing illegal MP3-transmission information of the products for the music-company members, wherein the member is requested to enter its member name and password; after the identity has been confirmed, the Web Service feeds back illegal MP3-transmission information, including the titles of the member's songs having been illegally transmitted, the IP addresses of the sender and the receiver, the transmission date. |
| ADMCheckState | Providing the function of inspecting the system status from a distal end for the system administrator, wherein the system administrator is requested to enter the administrator name and password, and after the identity has been confirmed, the status of the Web Service system is fed back to the administrator. |

Operational process of MP3 authentication server: The MP3 authentication server separately uses two resident programs—MP3 Listener and MP3 Lizard to process the MP3 files sent out by the MP3 sniffer via the socket and to transmit the extracted feature values to the database and report information anytime.

Figure 6:
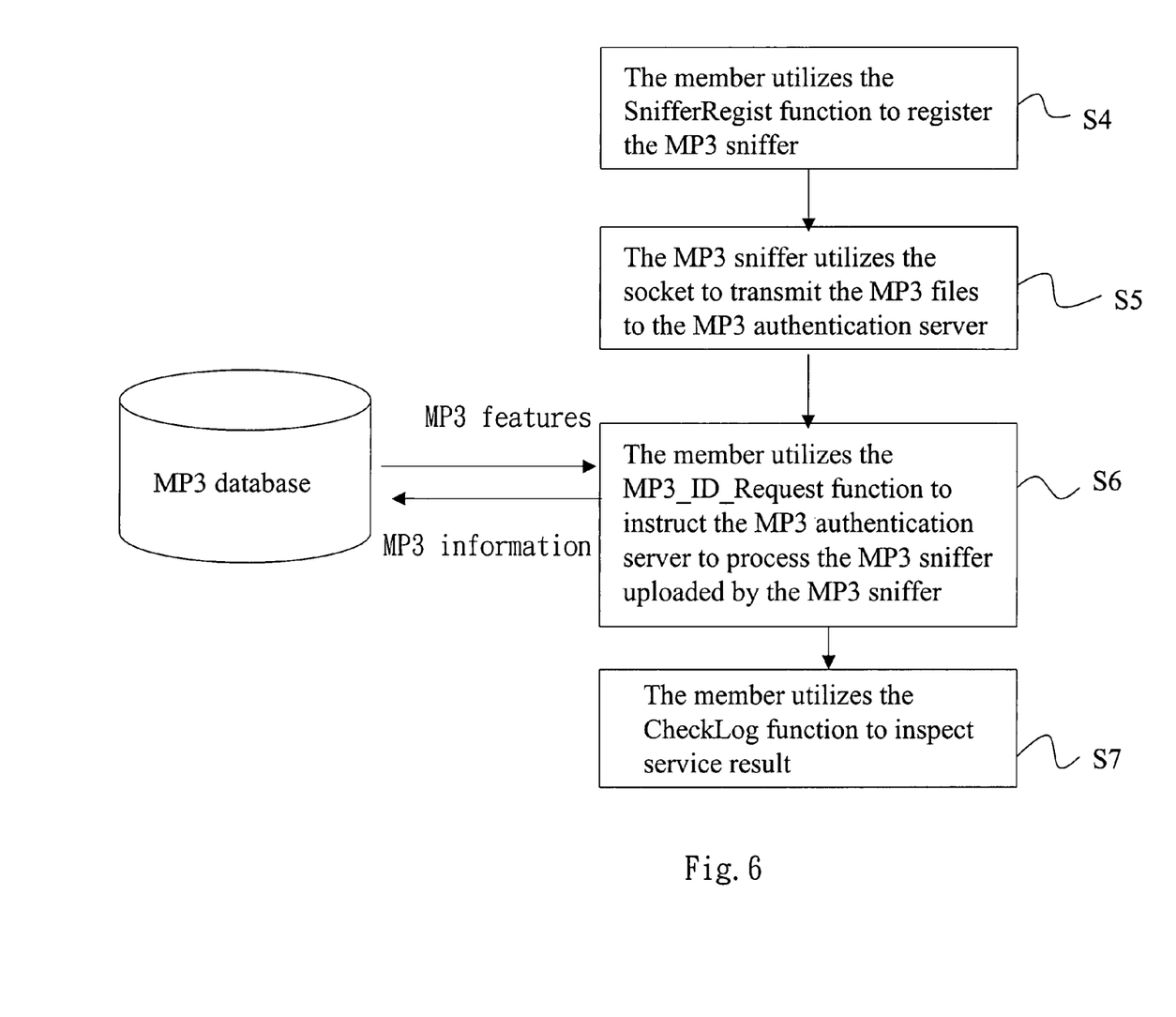
FIG. 6 is a flowchart showing the process whereby a general user utilizes the method of online detecting illegal MP3 music transmissions of the present invention.

The online illegal MP3-transmission identification service is primarily to identify legal copyrighted MP3 music for the MP3 sniffer on the client side and then record the transmissions information in the database so that the user of the MP3 sniffer can inspect. Refer to FIG. 6 the flowchart of using the online illegal MP3-transmission identification service. Firstly, the member utilizes the SnifferRegist function to register the MP3 sniffer (step S4). Next, The MP3 sniffer utilizes the socket to transmit the MP3 files to the MP3 authentication server (step S5). Next, the member utilizes the MP3_ID_Request function to instruct the MP3 authentication server to process the MP3 sniffer uploaded by the MP3 sniffer, and then the MP3 authentication server sends the MP3 packet to the MP3 discriminator to compare with the MP3 database and obtain the similarity therebetween, and the comparing results and related information are fed back to the MP3 authentication server (step S6). Lastly, the member utilizes the CheckLog function to review the similarity information and the related information received by the MP3 authentication server (step S7).

Figure 7:
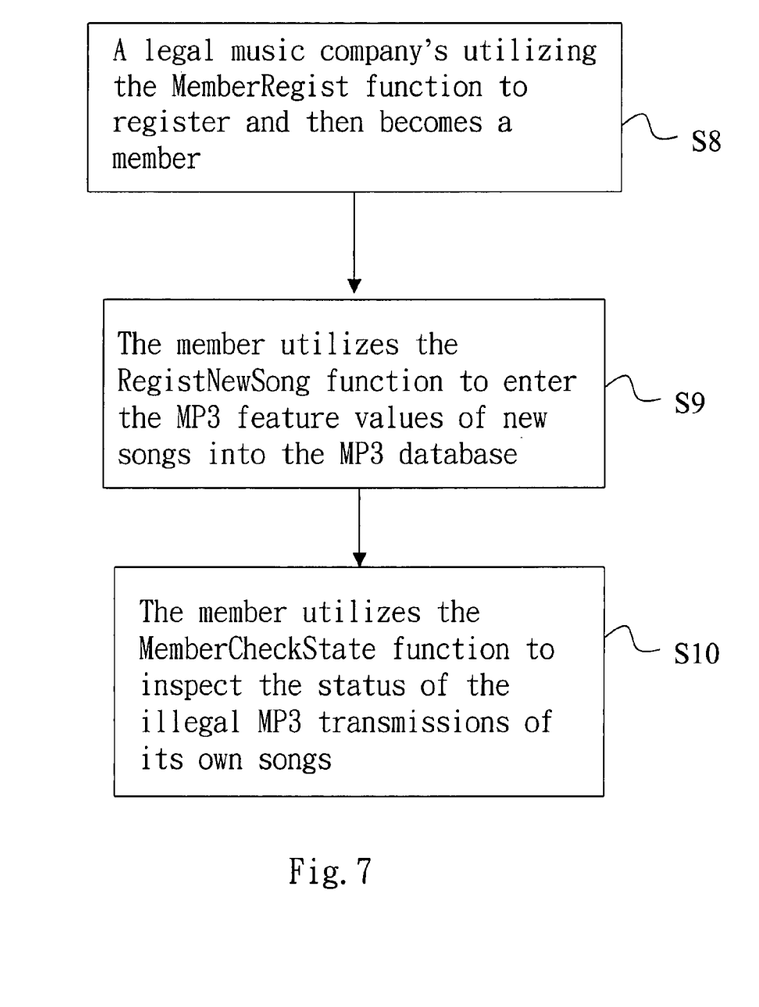
FIG. 7 is a flowchart showing the process of the Web Service for music-company members.

Once a music company becomes a member, it can utilizes the services, such as registering new songs, to detect the illegal transmissions of the MP3 music files of its own songs, and the related information, such as the IP addresses, the transmissions dates, will also be recorded for inspection; thereby, the music intellectual property will be protected. Refer to FIG. 7 for the flowchart of the services the MP3 authentication server provides for legal music companies. Firstly, a legal music company utilizes the MemberRegist function to register and then becomes a member (step S8). Next, the member utilizes the RegistNewSong function to enter the MP3 feature values of new songs into the MP3 database (step S9). Lastly, the member utilizes the MemberCheckState function to inspect the status of the illegal MP3 transmissions of its own songs (step S10).

MP3 discriminator: In the present invention, during the MP3 decoding process, the output of the polyphase filter banks is normalized and aggregated to obtain the MP3 feature value, which is a 32-dimensional vector. To make sure that the MP3 feature values of the MP3 files encoded by different encoders still have a very high similarity, ten most popular MP3 encoders are chose to encode a song into MP3 files, the feature values of the MP3 files based on various sampling rates, mono modes and stereo modes are extracted out to estimate the similarity, wherein the Euclidean distance between the feature vectors of two MP3 files is used to estimate the similarity. The feature value of an MP3 file intercepted in the network will be compared with the feature value of each MP3 file recorded in the MP3 database to estimate the similarity therebetween; the song having a given similarity is screened out, and the transmission of the intercepted MP3 file will be determined to be illegal.

MP3 database: The system of the present invention needs a large-scale MP3 database, which contains the feature values of all the copyrighted MP3 files. In addition to the feature values of the MP3 music files, the MP3 database also comprises the basic data of the copyrighted songs, such as the signers, the lyrics, the notations, and the music albums, and also comprises all the information the system needs. The principal data of the MP3 database is described blow.

| Data | Description |
| --- | --- |
| UsrData | Recording the identity information of the system administrators, the music-company members and the users of the MP3 sniffer, and used in identity verification and authority administration. |
| SniffedFeatures | Receiving the feature values of the MP3 files coming from the MP3 authentication server, and primarily used in the discrimination of the MP3 files sniffed out by the MP3 sniffer. |
| MP3_Features | Recording the feature values of the copyrighted MP3 music files. |
| ISRC | Recording the basic information of copyrighted songs, and having ISRC identifiers as the indexing keyword. |
| IdentifyMP3 | Recording the feature values a general user inputs for the comparison undertaken by the MP3 authentication server. |
| Album | Recording the basic information of MP3 music albums. |

In summary, the present invention proposes a method of online detecting MP3 music transmissions and an architecture thereof, wherein an MP3 sniffer, an MP3 authentication server, an MP3 discriminator, and an MP3 database are integrated to sniff out and intercept MP3 packets from the data transmitted over the Internet, and the feature values thereof are used to perform data comparison in order to determine whether the transmissions of the intercepted MP3 files is legal, and if it is illegal, the transmission date and the IP addresses of the sender and the receiver of the illegal transmission will be recorded in illegal-transmission log in order to implement inspection and protect the intellectual property.

Those described above are not intended to limit the scope of the present invention but only the preferred embodiments of the present invention. Any equivalent modification and variation according to the spirit of the present invention is to be included within the scope of the present invention.

What is claimed is:

1. A method of online detecting detection of illegal MP3 music transmissions, comprising the following steps:
providing at least one first processor for intercepting packets transmitted over network segments, and identifying multiple MP3 packets according to the header format formulated by an MPEG organization;
providing at least one second processor for extracting out at least one feature value from each of said MP3 packets, said extraction including normalizing and aggregating values output by polyphase filter banks during an MP3 decoding process to obtain a feature value that is a 32-dimensional vector; and
providing a third processor for comparing said feature value with a plurality of MP3 feature values stored in an MP3 database to obtain a similarity therebetween, and if the transmission of MP3 packets is determined to be illegal, then communicating the similarity information, a transmission date, a sender IP address and a receiver IP address to said second processor for recordation in a log.

2. The method of online detection of illegal MP3 music transmissions according to claim 1, wherein said step of providing at least one first processor includes the step of providing at least one network packet sniffer.

3. The method of online detection of illegal MP3 music transmissions according to claim 1, wherein said step of providing at least one second processor includes providing an MP3 authentication server.

4. The method of online detection of illegal MP3 music transmissions according to claim 1, wherein the step of providing a third processor includes the step of providing an MP3 discriminator.

5. The method of online detection of illegal MP3 music transmissions according to claim 1, wherein said MP3 database comprises:
a user information field, used in identity verification and authority administration;
a feature value field of identified MP3 music files, used in the discrimination of the MP3 files identified by said first processor;
a feature value field of copyrighted MP3 music files, recording the feature values of copyrighted MP3 music files;
an MP3 definition field, recording the feature values a general user inputs for the comparison undertaken by the at least one second processor; and an album field, recording the basic information of MP3 songs.

6. A system for online detection of illegal MP3 music transmissions, comprising:
at least one first processor serving as an MP3 sniffer, said processor intercepting packets transmitted over segments of a network, and identifying multiple MP3 packets according to detection of a header format formulated by an MPEG organization;
at least one second processor serving as an MP3 authentication server coupled to said at least one first processor for receiving said identified MP3 packets therefrom, said MP3 authentication server extracting out a feature value from each of said identified MP3 packets, the feature value being a 32-dimensional vector;
an MP3 database, storing feature values of a multiplicity of copyrighted MP3 music files; and
a third processor serving as an MP3 discriminator coupled to said MP3 authentication server and said MP3 database, said MP3 discriminator receiving the feature value coming from said MP3 authentication server and the feature values stored in said MP3 database and comparing them to identify a similarity therebetween, wherein said MP3 discriminator communicates said similarity information, a transmission date, a sender IP address and a receiver IP address to said MP3 authentication server for recordation in a log responsive to the transmission of said identified MP3 packets being determined to be an illegal transmission thereof.

7. The system for online detection of illegal MP3 music transmissions according to claim 6, wherein said at least one first processor is coupled to a network card coupled to the network to enter into a promiscuous mode in order to intercept said packets transmitted over said segments of the network.

8. The system for online detection of illegal MP3 music transmissions according to claim 6, wherein said MP3 sniffer analyzes an intercepted packet to identify a connection port intended to perform data transmissions, and said MP3 sniffer can then perform packet-interception at said identified connection port.

9. The system for online detection of illegal MP3 music transmissions according to claim 6, wherein said MP3 authentication server maintains registration information of copyright owners as subscriber members, stores membership identification information and verifies members, downloads data from said log to members, transmits new MP3 feature values to said MP3 database.

10. The system for online detection of illegal MP3 music transmissions according to claim 6, wherein said MP3 feature value is obtained via normalizing and aggregating the values output by polyphase filter banks during an MP3 decoding process.

11. The system for online detection of illegal MP3 music transmissions according to claim 6, wherein said MP3 database comprises:
- an user information field, used in identity verification and authority administration;
- a feature value field of identified MP3 music files, used in the discrimination of the MP3 files identified by the MP3 sniffer;
- a feature value field of copyrighted MP3 music files, recording the feature values of copyrighted MP3 music files;
- an MP3 definition field, recording the feature values a general user inputs for the comparison undertaken by the MP3 authentication server; and
- an album field, recording the basic information of MP3 songs.

\* \* \* \* \*